F. SCHOETTLE.

Improvement in the Construction of Shearing-Machines.

No. 4,968. Reissued July 9, 1872.

Witnesses:
Jacob E. Schiedt
Alfred C. Savidge

Inventor:
Ferdinand Schoettle
by John A. Wiedersheim
Atty.

AM. PHOTO-LITHOGRAPHIC CO. N.Y. (OSBORNE'S PROCESS.)

UNITED STATES PATENT OFFICE.

FERDINAND SCHOETTLE, OF PHILADELPHIA, PENNSYLVANIA.

IMPROVEMENT IN THE CONSTRUCTION OF SHEARING-MACHINES.

Specification forming part of Letters Patent No. 122,333, dated January 2, 1872; reissue No. 4,968, dated July 9, 1872.

*To all whom it may concern:*

Be it known that I, FERDINAND SCHOETTLE, of the city and county of Philadelphia and State of Pennsylvania, have invented new and useful Improvements in Shears; and I do hereby declare the following to be a clear and exact description thereof, sufficient to enable others skilled in the art to which my invention appertains to fully understand and use the same, reference being had to the accompanying drawing making part of this specification, in which—

Figure 1:
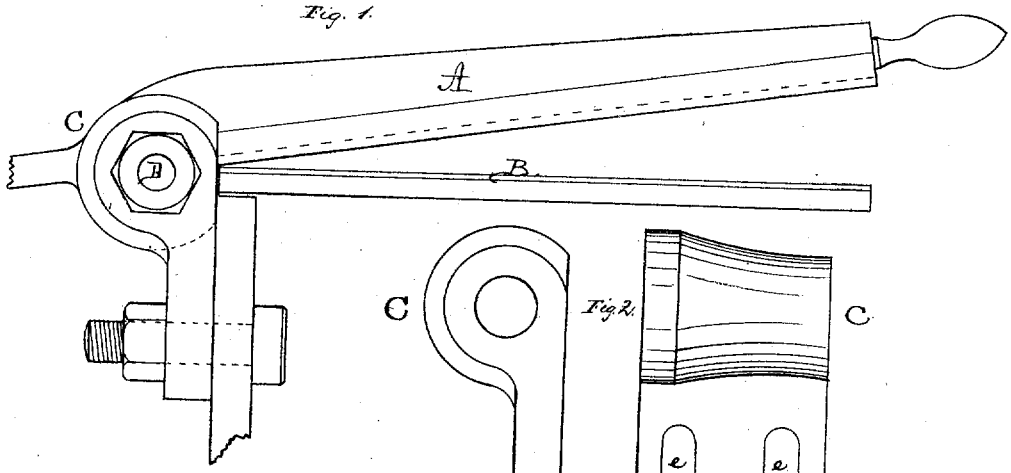
Figure 1:
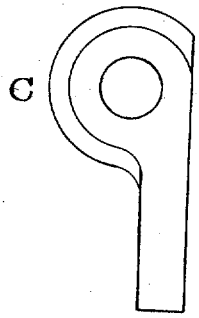
Figure 2:
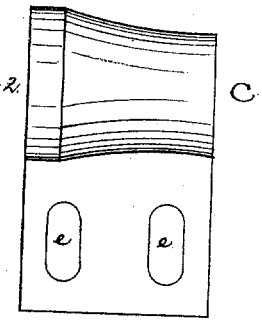
Figure 3:
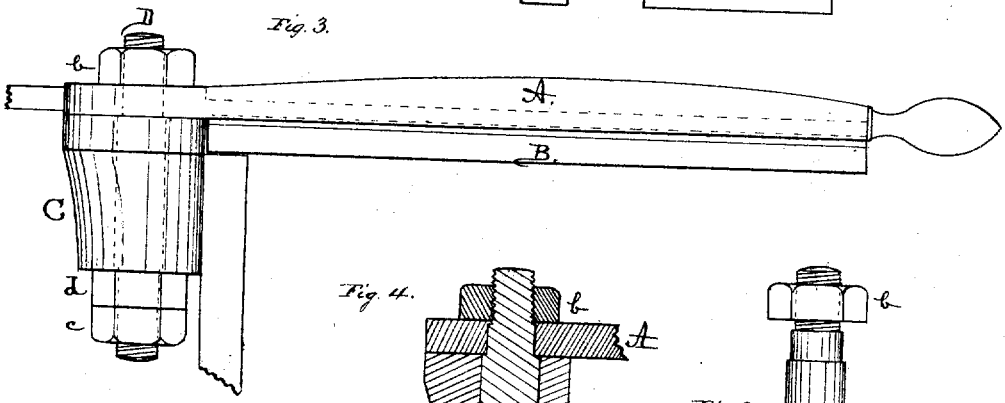
Figure 4:
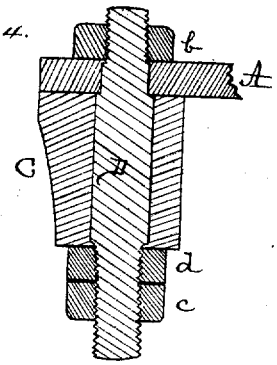
Figure 5:
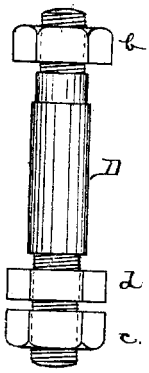
Figure 5:
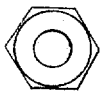

Figure 1 is a side view of the device illustrating my invention. Fig. 2 is a top or plan view thereof. Figs. 3, 4, and 5 are views of detached parts. Fig. 6 is a section of the journal-box, upper knife, and the tightening-bolt.

Similar letters of reference indicate corresponding parts in the several figures.

This invention relates to an improvement in stationary shears employed for cutting paper, pasteboard, and other light material; and consists in attaching the upper knife or lever to the lower knife or lever, or the table or stand thereof, by means of an extended journal-box in connection with an adjusting-bolt or journal, whereby said upper knife or lever will turn on its axis with nicety and regularity, and the lost motion due to wear and tear may be taken up, as required.

Referring to the drawing, A B represent a pair of shears, of which A, the upper blade or lever, is movable, and B is the lower or stationary blade or lever, the latter being attached to a stable or stand in any well-known manner. C represents the journal-box of the movable blade, which is extended in length at an angle with the line of the direction of the shears, so as to form a large bearing-surface; and through the box passes a bolt, D, whereby the upper blade or lever is attached to the stationary part by means of said journal-box and bolt. The inner end of the bolt or journal D is reduced in diameter to correspond with the opening in the eye or swell of the upper blade A. A nut, *b*, secures this blade to the bolt D. When the nut *b* is screwed up the blade is firmly pressed against the shoulder formed by the reduction of the diameter of the bolt. The outer end of the bolt is shorter than the journal-box C, to provide for the wear of the eye of the blade A, and the end of the box C against each other. A nut, *d*, on the opposite end of the bolt bears against the journal, and also serves to take up the lost motion of the blade A, and thereby prevent it from wabbling. A set-nut, *c*, is applied to the bolt D, to prevent the nut *d* from loosening or backing off while the shears are being operated.

The pin or journal D passes through the journal-box and forms the axis of the movable jaw. As has been mentioned, the larger diameter is shorter than the box C, whereby, by means of the nuts, the blade may be nicely adjusted, and all lost motion caused by the wear and tear of the blade taken up. Provision is made for the vertical adjustment of the upper blade by means of slots *e e*, in the butting-piece of the axis of the knife or blade. By backing or loosening the proper bolts in the slots *e e*, the blade may be adjusted so as to have imparted to it more or less shear.

Having thus described my invention, what I claim as new, and desire to secure by Letters Patent, is—

The attachment of the blades or levers A B by means of an extended journal-box, C, and a tightening-bolt or journal, D, constructed and combined substantially as described.

F. SCHOETTLE.

Witnesses:
JOHN A. WEIDERSHEIM,
ALFRED C. SAVIDGE.